United States Patent
Cassar et al.

(10) Patent No.: US 12,128,968 B2
(45) Date of Patent: Oct. 29, 2024

(54) METHOD FOR CONTROLLING A STEERING SYSTEM WITH TWO REDUNDANT MOTORIZATIONS

(71) Applicant: JTEKT EUROPE, Irigny (FR)

(72) Inventors: Stéphane Cassar, Munich (DE); Bruno Collerais, Munich (DE); Giovanni Dallara, Munich (DE)

(73) Assignee: JTEKT EUROPE, Irigny (FR)

( * ) Notice: Subject to any disclaimer, the term of this patent is extended or adjusted under 35 U.S.C. 154(b) by 715 days.

(21) Appl. No.: 16/772,003

(22) PCT Filed: Dec. 6, 2018

(86) PCT No.: PCT/FR2018/053127
§ 371 (c)(1),
(2) Date: Jun. 11, 2020

(87) PCT Pub. No.: WO2019/115914
PCT Pub. Date: Jun. 20, 2019

(65) Prior Publication Data
US 2021/0086824 A1 Mar. 25, 2021

(30) Foreign Application Priority Data
Dec. 11, 2017 (FR) ..................................... 17/61930

(51) Int. Cl.
*B62D 5/04* (2006.01)
(52) U.S. Cl.
CPC ......... *B62D 5/0463* (2013.01); *B62D 5/0481* (2013.01); *B62D 5/0484* (2013.01); *B62D 5/0487* (2013.01)

(58) Field of Classification Search
CPC .. B62D 5/0463; B62D 5/0481; B62D 5/0484; B62D 5/0487; B62D 5/04
See application file for complete search history.

(56) References Cited

U.S. PATENT DOCUMENTS 6,499,559 B2 * 12/2002 Mc Cann ............. B62D 5/0463
701/41
2004/0007416 A1 * 1/2004 Furumi .................. B62D 5/046
180/443

FOREIGN PATENT DOCUMENTS

DE    10 2015 116 929 A1    4/2017
DE    10 2015 116 937 A1    4/2017
(Continued)

OTHER PUBLICATIONS

K.C. Colwell, Electric Feel: Nissan Digitizes Steering, But the Wheel Remains, 2013, caranddriver.com, pp. 2-4 (Year: 2013).*

(Continued)

*Primary Examiner* — Ig T An
*Assistant Examiner* — Chase L Cooley
(74) *Attorney, Agent, or Firm* — Oliff PLC

(57) ABSTRACT

A method for controlling a steering system of a motor vehicle, including two channels arranged in parallel and each including an electric drive delivering an assistive force for assisting in the steering of the vehicle, so as to obtain a sum of the two delivered assistive forces that corresponds to a total requested assistive force requirement, this method being noteworthy in that a first channel delivers a first portion of the total assistive force requirement, and in that the second channel delivers a variable complementary assistive force portion, corresponding to the difference between the estimated or measured first force portion that is actually delivered and the total force requirement.

9 Claims, 1 Drawing Sheet

(56) References Cited

FOREIGN PATENT DOCUMENTS

Figure 1:
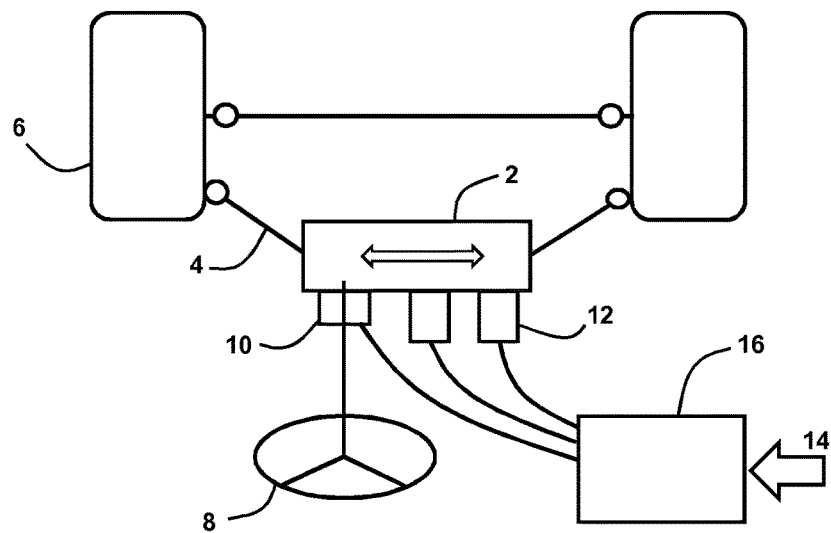

| EP | 1 375 300 A2 | 1/2004 |
| EP | 1 426 266 A2 | 6/2004 |
| WO | 2017/204718 A1 | 11/2017 |

OTHER PUBLICATIONS

Mar. 18, 2019 Search Report issued in International Patent Application No. PCT/FR2018/053127.
Mar. 18, 2019 Written Opinion of the International Searching Authority issued in International Patent Application No. PCT/FR2018/053127.

* cited by examiner

METHOD FOR CONTROLLING A STEERING SYSTEM WITH TWO REDUNDANT MOTORIZATIONS

The present invention concerns a method for controlling a steering system of a motor vehicle, as well as a steering system including means implementing such a control method.

Motor vehicles generally include a steering system comprising a motorization delivering a torque on the direction of the vehicle, which depends on the torque applied by the driver on the steering wheel, measured by a driver intention sensor, in order to provide a portion of the effort required to pivot the wheels.

Moreover, car manufacturers are currently developing autonomous driving functions, making it possible to carry out more or less automatically certain drive modes, such as automatic parking of the vehicle, driving in traffic jams, tracking a previous vehicle, or even completely autonomous driving according to the conditions, functions. These different functions involve the steering system to pivot the wheels with their motorizations.

The operational safety of the steering system is therefore important, both for assisting manual driving and for autonomous driving functions.

For this it is known to install on steering systems two motorizations disposed in parallel, each comprising an electric motor with its own power supply which can independently apply an assist torque on the steering.

Particularly, complete redundancy is achieved comprising the installation of two equivalent autonomous channels disposed in parallel, each including a motorization with its power supply, sensors for measuring the driver intention, and different functions such as the reception of signals coming from the vehicle, system control and motorization control.

A known method for controlling these two assist channels in a normal operating mode, ensures the delivery of actuating power from the identical steering for these two channels, which makes it possible to achieve complete equality of operation of the two motorizations.

In the case of a partial or total failure of one of the channels, which can come from all the elements of the channel such as the motorization, its power supply, its sensors or its other functions, the other channel delivers in a degraded operating mode at least in part the required actuating power.

However, this type of operation poses a first problem for delivering identical actuating power on the two channels, because of the need to perfectly control the synchronization of the two motorizations, comprising the control of the time and of the amplitude of the control signal.

In the case of an imbalance or a desynchronization of the powers delivered by the two motorizations, losses of efficiency of these motorizations and an instability are obtained. This results in a decrease in the performance of the assist system, which requires an increase in the installed power to compensate for these losses, resulting in additional costs.

It is also possible to obtain a generation of vibrations from the motorizations which affect driving comfort, and a decrease in response times to driver requests, which is detrimental in the case of rapid actuation of the steering by the driver.

A second posed problem is to obtain an equal power delivered by the two sources of electric power supplying the two channels. Indeed, the vehicle can be equipped with two independent power supply networks, their respective operating conditions can be variable and affect the power supply of the two channels which then deliver different power. This difference can cause disturbances in the operation of one channel relative to the other, affecting their synchronization and equality of operation.

Such a problem requires adaptations of the two supply networks resulting in costs, to ensure under all conditions the delivery of an identical power. In addition, the power of a second channel must be reduced in the case where the first channel has a limited capacity to maintain equality, which represents an overall loss of power provided by the assist system.

This first and this second problem generate on the one hand constraints of physical links between the two channels to ensure their synchronization, and on the other hand a constraint of controlling their own power supply networks.

These two constraints strongly limit the ability of the two channels to be actually independent from each other. A stronger link between the two channels to ensure sufficient performance, increases the ease of propagation of errors going from one channel to the other, and complicates the establishment of their diagnoses.

If one channel detects a failure, it must be taken out of service and the other channel must be kept as a backup channel. If the two channels are strongly linked together, a rapid diagnosis of the failure becomes difficult to carry out before any propagation of defects to the complete system. Additional diagnostics must then be performed to verify that the link between the two channels is not the faulty element. If this appears, the decision to switch from one channel to another becomes tricky.

The object of the present invention is in particular to avoid these drawbacks of the prior art.

To this end, it proposes a method for controlling a steering system of a motor vehicle, including two channels disposed in parallel, each comprising an electric motorization delivering an assist force on the vehicle steering, in order to obtain a sum of the two delivered assist forces corresponding to a total need for requested assist force, this method being remarkable in that a first channel delivers a first part of the total need for assist force, and in that the second channel delivers a variable additional part of assist force, corresponding to the difference between the first estimated or measured part of force actually delivered, and the total need for force.

The first channel delivers a first part of the total need for assist force and the second channel delivers, on the basis of an estimate or a measurement of the force actually delivered, a variable additional part of assist force to reach the total need for force.

An advantage of this control method is that in a simple and effective manner, without synchronizing the motorizations, the first part of force actually delivered by the first channel is evaluated, which can be a significant part of the total need, to deduce by comparison in real time with the total need for force, the additional part that the second channel must deliver. The control of the two channels is no longer simultaneous, but successive.

In this way, in the case of failure of the first channel no longer or incompletely delivering its part, the additional part to be delivered by the second channel then automatically increases as a function of this failure of the first channel, to obligatorily provide the additional part allowing to get the total need.

The control method according to the invention may further include one or more of the following characteristics, which can be combined with one another.

Advantageously, the first part of the total need for force corresponds to a percentage of this total need for force.

Particularly, the first part of the total need for force can correspond to the totality of this total need for force. In this way the calculation of the first part is simplified.

Advantageously, the method regularly alternates between the two channels, the function of the first channel delivering the first part of the total need for assist force. The operation is thus distributed in a more balanced manner on the two channels.

Advantageously, the method uses a first parameter coming from a function of estimating or measuring the situation of the vehicle electric network, particularly including the voltage, intensity or electric power deliverable by this network, to calculate the force parts.

Advantageously, the method uses a second parameter delivered by a function of establishing direction instructions coming from the vehicle or from an external source in order to help the maneuver of this direction, to calculate the force parts.

Advantageously, the method uses a third parameter delivered by a function of measuring the dynamic situation of the vehicle, in particular measuring the speed of the vehicle, its lateral, longitudinal or vertical acceleration, or its drift angle, to calculate the force parts.

Advantageously, the method uses a fourth parameter delivered by a function of detecting the vehicle in its environment, in particular establishing its geolocation with a global positioning system, or its position on a map, to calculate the force parts.

The invention also relates to a steering system comprising means implementing a method for controlling this steering system comprising any one of the preceding characteristics.

Particularly, the steering system can include two electric motorizations each delivering a torque on the vehicle steering.

Figure 2:
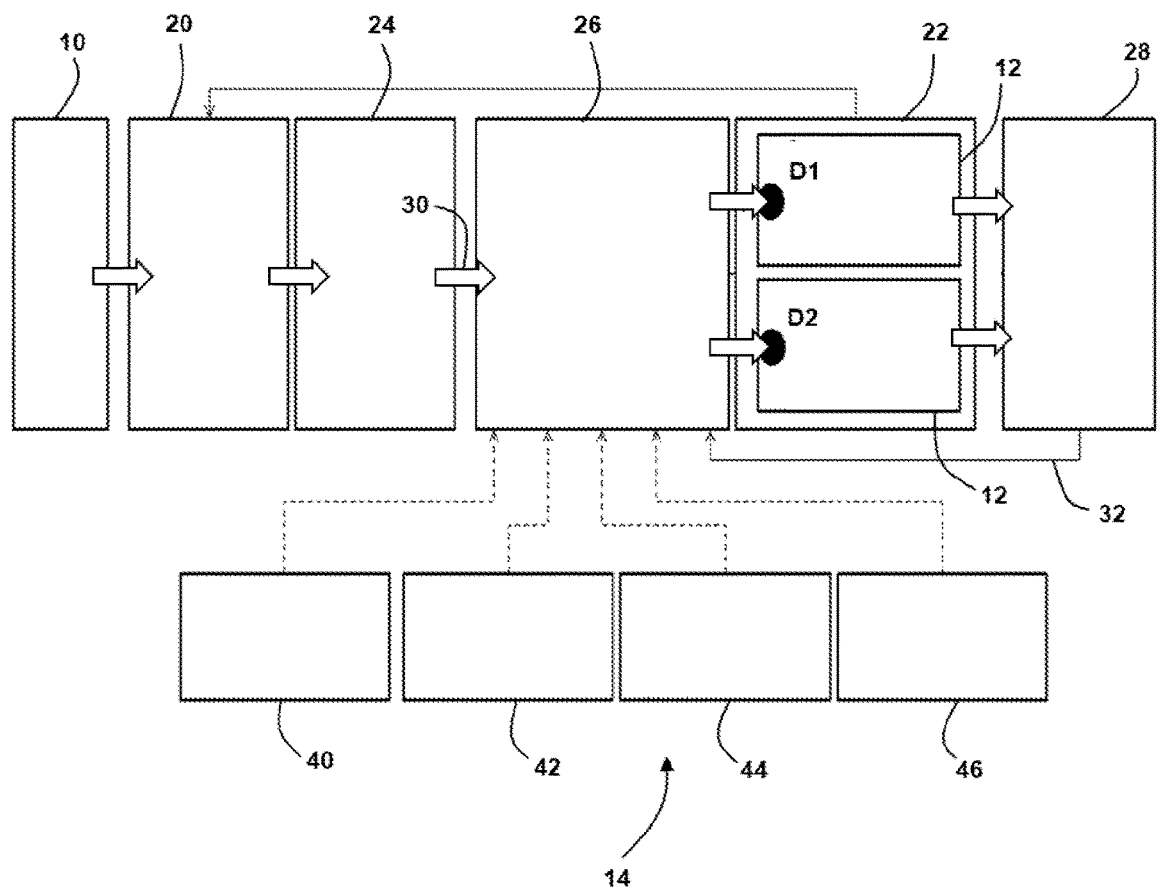

The invention will be better understood and other characteristics and advantages will appear more clearly on reading the description below given by way of example, with reference to the appended drawings in which:

FIG. 1 is a diagram of a motor vehicle steering implementing a control method according to the invention; and FIG. 2 is a flowchart showing the operation of this control method.

FIG. 1 shows a steering gear-box 2 including a rack transversely disposed in the vehicle, whose each end is connected by a link 4 to a front wheel hub 6 in order to pivot it to ensure the steering of the vehicle.

A steering column equipped with a steering wheel 8 maneuvered by the driver, connected to the steering gear-box 2, includes a force sensor applied by the driver on this column, constituting a device for measuring the intention of the driver 10.

Two electric motorizations 12 each forming a channel including its electric power supply and its control means, independently apply a torque on the steering gear-box 2, in order to add a total force to that delivered by the driver on the steering wheel 8 to provide an assistance in the case of manual driving, or to provide automatic steering in the case of autonomous driving of the vehicle.

The electric motorizations 12 may each include an electric motor delivering a torque, as presented below, or as a variant any other electromagnetic means applying a torque or a force on the steering gear-box 2, in the form of a rotation or a translation. Thereafter the action of the motorizations 12 will be indifferently called torque or force.

A control computer 16 is connected to the driver intention sensor 10, as well as to the motorizations 12 and their electric supplies, in order to establish torque settings for each of the motors, in particular as a function of different parameters received from the outside 14.

FIG. 2 shows the device of measuring the intention of the driver 10, including the force sensor applied by the driver to the steering column, sending information to a function of measuring the assist force actually applied by each electric motor 12. The assist force applied can particularly be the torque actually delivered by each of the motorizations 12, forming information received from the group of motorizations 22 including these two motorizations.

The function of measuring the applied assist force 20 sends information to a function of calculating the total need for assist force 24, which performs this calculation on the basis of all or part of the information delivered to it.

The function of calculating the total need for assist force 24 sends the total assist force need forming a first signal 30 to a function of controlling the redundant elements 26 constituted by the two motorizations 12, which calculates the target of the assist force intended for each of the motorizations contained in the group of motorizations 22, by delivering to each of them an individual torque setpoint signal D1, D2.

As a variant, the group of motorizations 22 can contain more than two redundant motorizations 12, in order to increase the safety level.

The control system of each motorization 12 receives the individual torque setpoint signal D1, D2 which is intended for it, to control the electronic power supply of its electric motor so that it delivers a motor torque corresponding to this setpoint.

Each motorization 12 then sends information to a function of estimating or measuring the capacity of the electric motors 28 to deliver the torque corresponding to its individual setpoint D1, D2. The estimation or measurement function 28 delivers this estimation or measurement in return forming a second signal 32 to the control function of the redundant elements 26.

In this way the function of controlling the redundant elements 26 disposes both the total need for assist force 30 established by the function of calculating the assist force target 24, and takes into account the estimation or measurement of the second signal 32 representing the capacity of each motorization 12 to deliver the torque requested of it, to adjust the individual setpoint signal that it will request from each of these motorizations.

Particularly, the function of controlling the redundant elements 26 takes into account in real time the operating particularities of each motorization 12, according to the evolution of its state, to distribute the individual torque setpoint D1, D2 between the two motorizations in order to obtain a sum of delivered torque corresponding to the total need for assist force 30.

The control function of the redundant elements 26 receives several external parameters 14 for calculating the setpoints D1, D2, comprising a first parameter coming from a function of estimating or measuring the situation of the electric network of the vehicle 40, particularly comprising the voltage, the intensity and the electric power deliverable through this network.

In this way the function of controlling the redundant elements 26 knows in real time the possibility of supplying electric power to each motorization 12, which can be different for each of these motorizations in the case of an imbalance in the supply networks, in order to establish its individual torque setpoint D1, D2 corresponding to a torque that it can deliver.

A function of establishing direction instructions 42 coming from the vehicle or from an external source, to assist in the maneuvering of this direction, delivers a second parameter to the function of controlling the redundant elements 26.

A function of measuring the dynamic situation of the vehicle 44, measuring for example the speed of the vehicle, its lateral, longitudinal or vertical acceleration, or its drift angle, delivers a third parameter to the function of controlling the redundant elements 26.

A function of detecting the vehicle in its environment 46, establishing for example its geolocation with a global positioning system «GPS», or its position on a map, delivers a fourth parameter to the function of controlling the redundant elements 26.

The operation of the control method according to the invention is as follows. A first channel formed by a first motorization 12 delivers a first part of the total need for assist force 30 according to its received individual torque setpoint D1, which can for example be a predefined percentage of the total need. Particularly, this first part can constitute a majority part of the total need for the assist force.

Then, taking into account the second signal 32 comprising the capacity of the first channel to deliver the requested torque, the individual torque setpoint D2 of the second channel is established, which must deliver an additional part of the assist force corresponding to the difference between the first part of force actually delivered and the total need for force.

The two motorizations work in a complementary way one of the other, and must thus execute requests of unequal forces not requiring any synchronization between them.

In this way any variation in torque delivered by the first channel relative to its individual torque setpoint D1, for example coming from a failure of the motorization comprising its electric motor, its sensors, its electronic circuits, or from a failure of its power supply, giving an insufficient or zero torque, is automatically compensated by the second channel which delivers the difference required to reach the total need for force requested by the steering system.

Similarly, any failure delivered by the second channel with respect to its individual torque setpoint D2 is indicated by the second signal 32 to the function of controlling the redundant elements 26, to correct the individual setpoint D1 of the first channel in order to compensate and obtain the total requested need for force.

The absence of synchronization between the two channels, which are not requested for an identical force, greatly reduces the common failure modes between these two channels, and any propagation of defects between them, which improves the safety of the method. In the same way, the signals coming from the external parameters 14, acting individually on each of the channels, avoid common failures of the two channels.

Generally, the method can operate with only one motorization, or with the two motorizations together operating one in a complementary manner to the other. For operation with a single motorization, its individual torque setpoint D1, D2 is then equal to the total need for force, the second motorization remaining permanently controlled at a low or zero setpoint so as to be ready to instantly deliver the variable additional part of assist force which will be detected automatically in the case of insufficient torque delivery by this first motorization.

In this case, it is advantageously possible to regularly reverse the role of the motorization, comprising one executing the part of the required assist force, within the limits of its possibilities, and the other, remaining on standby to compensate or to complete the first part, for example after each start of the vehicle, so as to similarly use these two motorizations to equalize their operating wear.

The complementary operation of the two motorizations can be used to deliver a significant power expected by the driver, in the case of rapid maneuvers for example. Imperfections in the control of the motorizations giving for example small perceptible vibrations, in this case of driving which is infrequent will not affect the comfort of the vehicle.

The invention claimed is:

1. A method for controlling a steering system of a motor vehicle, comprising first and second channels disposed in parallel, each of the first and second channels comprising an electric motorization delivering an assist force on the steering of the vehicle, in order to obtain a sum of the two delivered assist forces corresponding to a total need for requested assist force, the method comprising:
   providing a first target assist force value to the first channel to deliver a variable first part of the total need for requested assist force,
   providing a second target assist force value to the second channel to deliver a variable additional part of the total need for requested assist force,
   after providing the first and second target assist force values to the respective first and second channels, determining an actual assist force provided by each of the first channel and the second channel, and
   adjusting only one of (i) the first target value based on the determined actual assist force provided by the second channel and (ii) the second target value based on the determined actual assist force provided by the first channel so as to provide the total need for requested assist force,
   wherein the first target value and the second target value is each greater than zero and correspond to less than the total need for requested assist force.

2. The control method according to claim 1, wherein the first part of the total need for requested assist force corresponds to less than a totality of this total need for force.

3. The control method according to claim 1, wherein the control method regularly alternates between the two channels the function of first channel delivering the first part of the total need for assist force.

4. The control method according to claim 1, wherein the control method uses a first parameter coming from a function of estimating or measuring the situation of the electric network of the vehicle to calculate the force parts.

5. The control method according to claim 1, wherein the control method uses a second parameter delivered by a function of establishing direction instructions coming from the vehicle or from an external source in order to help the maneuver of this direction, to calculate the force parts.

6. The control method according to claim 1, wherein the control method uses a third parameter delivered by a function of measuring the dynamic situation of the vehicle to calculate the force parts.

7. The control method according to claim 1, wherein the control method uses a fourth parameter delivered by a function of detecting the vehicle in its environment to calculate the force parts.

8. A steering system of a motor vehicle, comprising means for controlling this steering system, the means for controlling this steering system comprising two channels disposed in parallel, each comprising an electric motorization configured to deliver an assist force on the steering of the vehicle, in order to obtain a sum of the two delivered assist forces corresponding to a total need for requested assist force, wherein a first channel is configured to deliver a first non-zero part of the total need for assist force, and a second channel is configured to deliver a variable additional non-zero part of assist force, the means for controlling this steering system providing the first non-zero part of the total need for assist force and the variable additional non-zero part of assist force to the respective first and second channels, then determining an actual assist force provided by each of the first channel and the second channel, and then adjusting the variable additional non-zero part of assist force corresponding to a difference between a measured first part of force actually delivered by the first channel, and the total need for force.

9. The steering system according to claim 8, wherein the steering system includes two electric motors each delivering a torque on the direction of the vehicle.

\* \* \* \* \*